United States Patent
Shivalinga et al.

(10) Patent No.: US 11,261,029 B2
(45) Date of Patent: Mar. 1, 2022

(54) CYCLIC-FORCE BRAKE CASTER ASSEMBLY

(71) Applicant: Goodrich Corporation, Charlotte, NC (US)

(72) Inventors: Vinodkumar Shivalinga, Bangalore (IN); Venkatesh Chitragar, Bangalore (IN)

(73) Assignee: Goodrich Corporation, Charlotte, NC (US)

( * ) Notice: Subject to any disclaimer, the term of this patent is extended or adjusted under 35 U.S.C. 154(b) by 290 days.

(21) Appl. No.: 16/678,379

(22) Filed: Nov. 8, 2019

(65) Prior Publication Data
US 2021/0039436 A1 Feb. 11, 2021

(30) Foreign Application Priority Data
Aug. 5, 2019 (IN) .............................. 201941031624

(51) Int. Cl.
| | | |
|---|---|---|
| B65G 13/075 | (2006.01) | |
| B65G 13/00 | (2006.01) | |
| B65G 39/02 | (2006.01) | |
| B65G 23/08 | (2006.01) | |
| B60B 33/00 | (2006.01) | |
| B60B 27/00 | (2006.01) | |

(52) U.S. Cl.
CPC ........ *B65G 13/075* (2013.01); *B60B 27/0052* (2013.01); *B60B 33/0015* (2013.01); *B60B 33/0044* (2013.01); *B60B 33/0086* (2013.01); *B65G 13/00* (2013.01); *B65G 23/08* (2013.01); *B65G 39/025* (2013.01)

(58) Field of Classification Search
CPC ...... B65G 13/075; B65G 13/00; B65G 23/08; B65G 39/025; B60B 27/0052; B60B 33/0086; B60B 33/0015; B60B 33/0044
See application file for complete search history.

(56) References Cited

U.S. PATENT DOCUMENTS

| | | | | |
|---|---|---|---|---|
| 3,376,965 A | * | 4/1968 | Tregoning | B65G 13/075 193/35 R |
| 3,918,561 A | * | 11/1975 | Isacsson | B65G 13/075 193/35 A |
| 4,000,796 A | * | 1/1977 | Bolton | B65G 13/075 193/35 A |
| 5,048,660 A | * | 9/1991 | Kilper | B65G 1/08 193/35 A |
| 5,677,488 A | | 10/1997 | Monahan | |

(Continued)

FOREIGN PATENT DOCUMENTS

| | | | |
|---|---|---|---|
| CN | 106515807 | 3/2017 | |
| DE | 202011106752 U1 * | 11/2011 | ........... B65G 13/075 |

OTHER PUBLICATIONS

USPTO, Notice of Allowance dated May 20, 2021 in U.S. Appl. No. 16/943,509.

*Primary Examiner* — Mark A Deuble
(74) *Attorney, Agent, or Firm* — Snell & Wilmer L.L.P.

(57) ABSTRACT

A brake mechanism for a brake caster is disclosed. In various embodiments, the brake mechanism includes a shaft; a guide plate having a roller; and a slider plate having a first axial facing surface with a slider plate trough and a slider plate peak, the slider plate configured to slide on the shaft in response to the roller interacting with the slider plate trough and the slider plate peak.

20 Claims, 11 Drawing Sheets

(56) References Cited

U.S. PATENT DOCUMENTS

| | | |
|---|---|---|
| 6,131,717 A | 10/2000 | Owen |
| 6,336,542 B1 | 1/2002 | Mintonye, II |
| 6,834,757 B2 | 12/2004 | Holzner et al. |
| 7,021,456 B2 * | 4/2006 | Haan .................... B65G 13/075 193/35 A |
| 7,469,593 B2 | 12/2008 | Zumberge et al. |
| 8,109,702 B2 | 2/2012 | Stegmiller et al. |
| 9,694,978 B2 | 7/2017 | Harms et al. |
| 9,889,990 B2 | 2/2018 | Dimitrov et al. |
| 10,377,288 B2 | 8/2019 | Davis |
| 10,882,698 B2 * | 1/2021 | Shivalinga .............. F16D 11/10 |
| 11,124,364 B1 * | 9/2021 | Chitragar ............. B65G 13/075 |
| 2005/0121296 A1 * | 6/2005 | Haan .................... B65G 13/075 198/780 |
| 2006/0107765 A1 | 5/2006 | Sentoku |
| 2014/0360844 A1 | 12/2014 | Wilkins |
| 2017/0038627 A1 | 2/2017 | Jing |
| 2019/0061946 A1 | 2/2019 | Bogar et al. |

* cited by examiner

CYCLIC-FORCE BRAKE CASTER ASSEMBLY

CROSS-REFERENCE TO RELATED APPLICATIONS

This application claims priority to, and the benefit of, Indian Prov. Pat. Appl., Serial No. 201941031624, entitled "Cyclic-Force Brake Caster Assembly," filed on Aug. 5, 2019 at the Indian Patent Office, the entirety of which is incorporated herein for all purposes by this reference.

FIELD

The present disclosure relates generally to cargo handling systems and, more particularly, to subassemblies configured to decelerate or stop the movement of unit load devices on a cargo deck.

BACKGROUND

Cargo handling systems for aircraft typically include various tracks and rollers disposed on a cargo deck that spans the length of a cargo compartment. Cargo may be loaded from an entrance of the aircraft and transported by the cargo system to forward or aft locations, depending upon the configuration of the aircraft. Cargo handling systems, such as, for example, those used on aircraft for transport of heavy containerized cargo or pallets, also referred to herein as unit load devices (ULDs), typically include roller trays containing transport rollers that support and transport the containerized cargo or pallets. Motor driven rollers are typically employed in these systems. In certain aircraft, a plurality of motor driven power drive units (PDUs) is used to propel the containers or pallets within the cargo compartment. This configuration facilitates transportation of the containers or pallets within the cargo compartment by one or more operators or agent-based systems controlling operation of the PDUs.

Unwanted movement of ULDs during loading and unloading may present a safety risk to operators or related loading personnel or result in damage to an aircraft cargo compartment. Braking mechanisms are thus installed within the cargo handling system to help protect loading personnel and the aircraft from possible damage during loading and unloading due to unwanted movement. A typical braking mechanism includes a braking caster, which may have a rotating element that protrudes above a conveyor plane (e.g., the plane upon which the ULDs traverse the cargo deck) and is typically installed near the cargo door. The rotating element of the braking caster is configured to decelerate or stop a ULD, but allow travel when the ULD is manually or power driven over the cargo deck.

The rotating element typically has a preset braking load selected for a maximum weight of a loaded ULD at a maximum angle of the cargo deck or the conveyor plane. Because of the maximum settings, the braking load may be too powerful to allow the rotating element to roll under light loads. The rotating element often includes a friction material that surrounds the outer surface of a cylindrical roller. In instances where the load applied to the rotating element is not sufficient to overcome the braking load, the ULD may skid over the roller, wear away the friction material and create a flat spot on the roller.

SUMMARY

A brake mechanism for a brake caster is disclosed. In various embodiments, the brake mechanism includes a shaft; a guide plate having a roller; and a slider plate having a first axial facing surface with a slider plate trough and a slider plate peak, the slider plate configured to slide on the shaft in response to the roller interacting with the slider plate trough and the slider plate peak.

In various embodiments, the guide plate is configured for rotational engagement with a roller cylinder. In various embodiments, the slider plate is rotationally stationary with respect to the shaft. In various embodiments, the slider plate is coupled to a brake subassembly configured to cycle between a maximum brake force and a minimum brake force in response to axial movement of the slider plate.

In various embodiments, the shaft includes a second axial facing surface opposing the first axial facing surface, the second axial facing surface having a flange trough and a flange peak. In various embodiments, the guide plate is disposed intermediate the first axial facing surface and the second axial facing surface. In various embodiments, the slider plate is configured to slide on the shaft in response to the roller interacting with the slider plate trough and the slider plate peak and the flange trough and the flange peak. In various embodiments, the slider plate trough and the slider plate peak define a first periodic function. In various embodiments, the flange trough and the flange peak define a second periodic function. In various embodiments, at least one of the first periodic function and the second periodic function define a sine wave.

In various embodiments, one or more of the slider plate trough, the slider plate peak, the flange trough and the flange peak include a portion defined by a flat surface configured to generate a constant maximum brake force or a constant minimum brake force during a period of cyclic-brake force.

In various embodiments, a stationary plate is configured for attachment to a flange on the shaft, the stationary plate having a second axial facing surface opposing the first axial facing surface, the second axial facing surface having a stationary plate trough and a stationary plate peak. In various embodiments, the guide plate is disposed intermediate the first axial facing surface and the second axial facing surface.

A brake caster is disclosed. In various embodiments, the brake caster includes a base; and a brake mechanism connected to the base, the brake mechanism comprising a brake subassembly coupled to a slider disk subassembly, the brake subassembly configured to provide a cyclic-brake force in response to axial movement of a slider plate within the slider disk subassembly.

In various embodiments, the slider disk subassembly includes a shaft, a guide plate having a roller and the slider plate, the slider plate having a first axial facing surface with a slider plate trough and a slider plate peak, the slider plate configured to slide on the shaft in response to the roller interacting with the slider plate trough and the slider plate peak, the first axial facing surface characterized by a first periodic function.

In various embodiments, a second axial facing surface opposes the first axial facing surface, the second axial facing surface characterized by a second periodic function. the slider disk subassembly the second axial facing surface is provided by one of a flange attached to the shaft or a stationary plate disposed adjacent the flange. the slider disk subassembly the base is configured to rotate about an axis perpendicular to a conveyor plane.

A slider disk subassembly is disclosed. In various embodiments, the slider disk subassembly includes a guide plate having a roller; and a slider plate having a first axial facing surface with a slider plate trough and a slider plate peak, the slider plate configured to slide on a shaft in response to the roller interacting with the slider plate trough and the slider plate peak. In various embodiments, the slider plate trough and the slider plate peak define a first periodic function over at least a portion of the first axial facing surface.

The forgoing features and elements may be combined in various combinations without exclusivity, unless expressly indicated herein otherwise. These features and elements as well as the operation of the disclosed embodiments will become more apparent in light of the following description and accompanying drawings.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the following detailed description and claims in connection with the following drawings. While the drawings illustrate various embodiments employing the principles described herein, the drawings do not limit the scope of the claims.

DETAILED DESCRIPTION

The following detailed description of various embodiments herein makes reference to the accompanying drawings, which show various embodiments by way of illustration. While these various embodiments are described in sufficient detail to enable those skilled in the art to practice the disclosure, it should be understood that other embodiments may be realized and that changes may be made without departing from the scope of the disclosure. Thus, the detailed description herein is presented for purposes of illustration only and not of limitation. Furthermore, any reference to singular includes plural embodiments, and any reference to more than one component or step may include a singular embodiment or step. Also, any reference to attached, fixed, connected, or the like may include permanent, removable, temporary, partial, full or any other possible attachment option. Additionally, any reference to without contact (or similar phrases) may also include reduced contact or minimal contact. It should also be understood that unless specifically stated otherwise, references to "a," "an" or "the" may include one or more than one and that reference to an item in the singular may also include the item in the plural. Further, all ranges may include upper and lower values and all ranges and ratio limits disclosed herein may be combined.

Figure 1A:
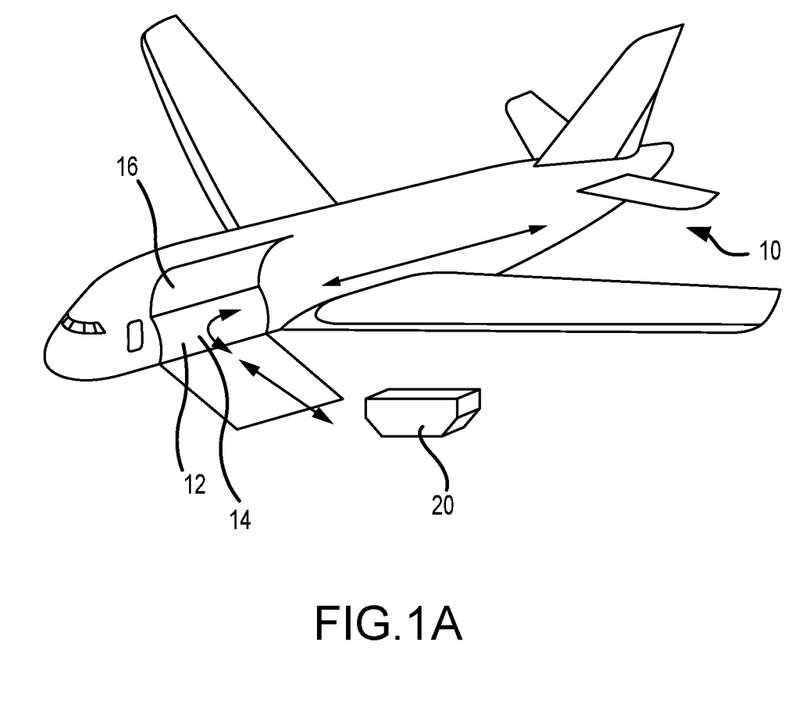
FIG. 1A illustrates a schematic view of an aircraft being loaded with cargo, in accordance with various embodiments.

With reference to FIG. 1A, a schematic view of an aircraft 10 having a cargo deck 12 located within a cargo compartment 14 is illustrated, in accordance with various embodiments. The aircraft 10 may comprise a cargo load door 16 located, for example, at one side of a fuselage structure of the aircraft 10. A unit load device (ULD) 20, in the form of a container or pallet, for example, may be loaded through the cargo load door 16 and onto the cargo deck 12 of the aircraft 10 or, conversely, unloaded from the cargo deck 12 of the aircraft 10. In general, ULDs are available in various sizes and capacities, and are typically standardized in dimension and shape. Once loaded with items destined for shipment, the ULD 20 is transferred to the aircraft 10 and then loaded onto the aircraft 10 through the cargo load door 16 using a conveyor ramp, scissor lift or the like. Once inside the aircraft 10, the ULD 20 is moved within the cargo compartment 14 to a final stowed position. Multiple ULDs may be brought on-board the aircraft 10, with each ULD 20 being placed in a respective stowed position on the cargo deck 12. After the aircraft 10 has reached its destination, each ULD 20 is unloaded from the aircraft 10 in similar fashion, generally in reverse sequence to the loading procedure. To facilitate movement of the ULD 20 along the cargo deck 12, the aircraft 10 may include a cargo handling system as described herein in accordance with various embodiments.

Figure 1B:
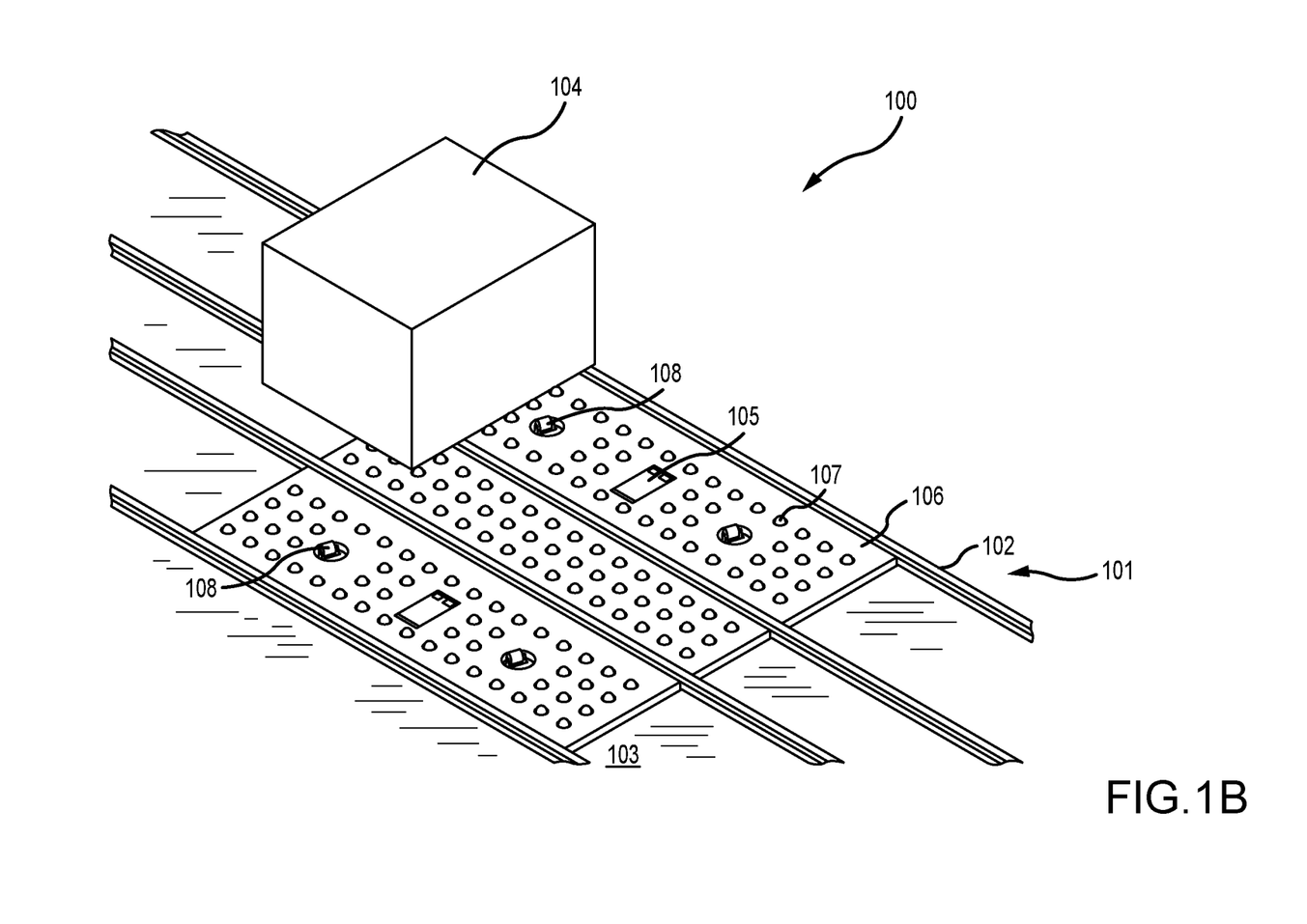
FIG. 1B illustrates a portion of a cargo handling system, in accordance with various embodiments.

Referring now to FIG. 1B, a portion of a cargo handling system 100 is illustrated, in accordance with various embodiments. The cargo handling system 100 is illustrated with reference to an XYZ coordinate system, with the X-direction extending longitudinally and the Z-direction extending vertically with respect to an aircraft in which the cargo handling system 100 is positioned, such as, for example, the aircraft 10 described above with reference to FIG. 1A. In various embodiments, the cargo handling system 100 may define a conveyance surface 101 having a plurality of trays 102 supported by a cargo deck 103, such as, for example, the cargo deck 12 described above with reference to FIG. 1A. The plurality of trays 102 may be configured to support a unit load device (ULD) 104 (or a plurality of ULDs), such as, for example, the unit load device (ULD) 20 described above with reference to FIG. 1A. In various embodiments, the ULD 104 may comprise a container or a pallet configured to hold cargo as described above. In various embodiments, the plurality of trays 102 is disposed throughout the cargo deck 103 and may support a plurality of power drive units 105, a plurality of ball panels 106, each having a plurality of ball transfer units 107, and a plurality of brake caster assemblies 108, together with other components configured to convey cargo over the cargo deck 103. In various embodiments, the plurality of brake caster assemblies 108 is located proximate a cargo load door, such as, for example, the cargo load door 16 described above with reference to FIG. 1A, but may otherwise be located throughout the cargo handling system 100 or the cargo deck.

Figure 2A:
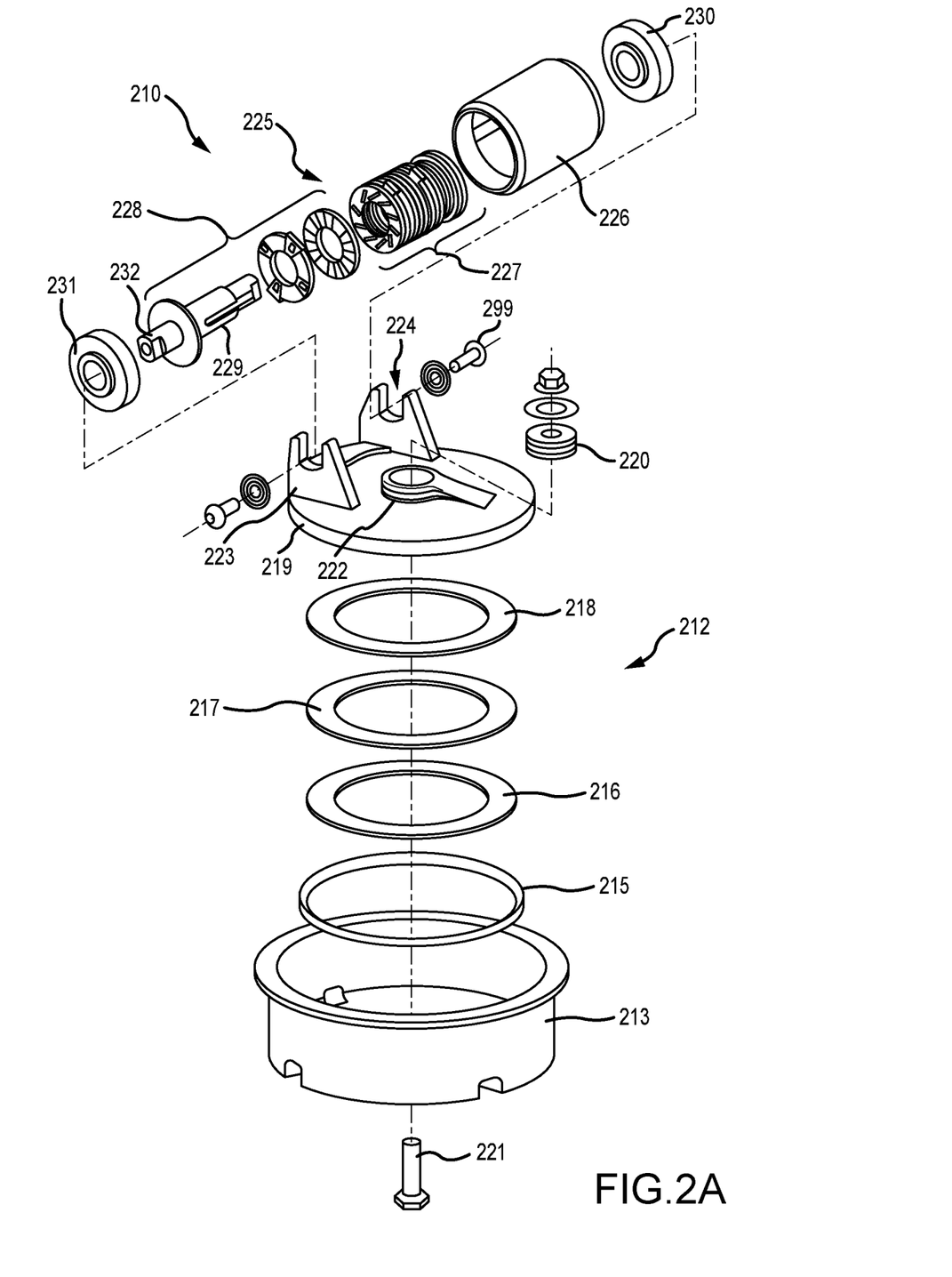
FIGS. 2A, 2B and 2C illustrate exploded and assembled views of a brake caster, in accordance with various embodiments.
Figure 2B:
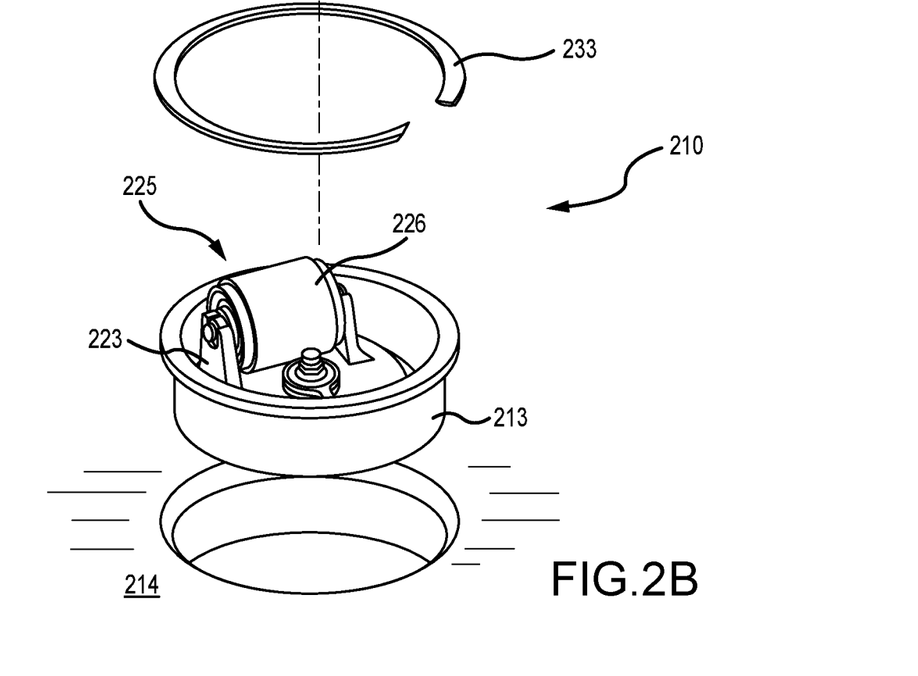
Figure 2C:
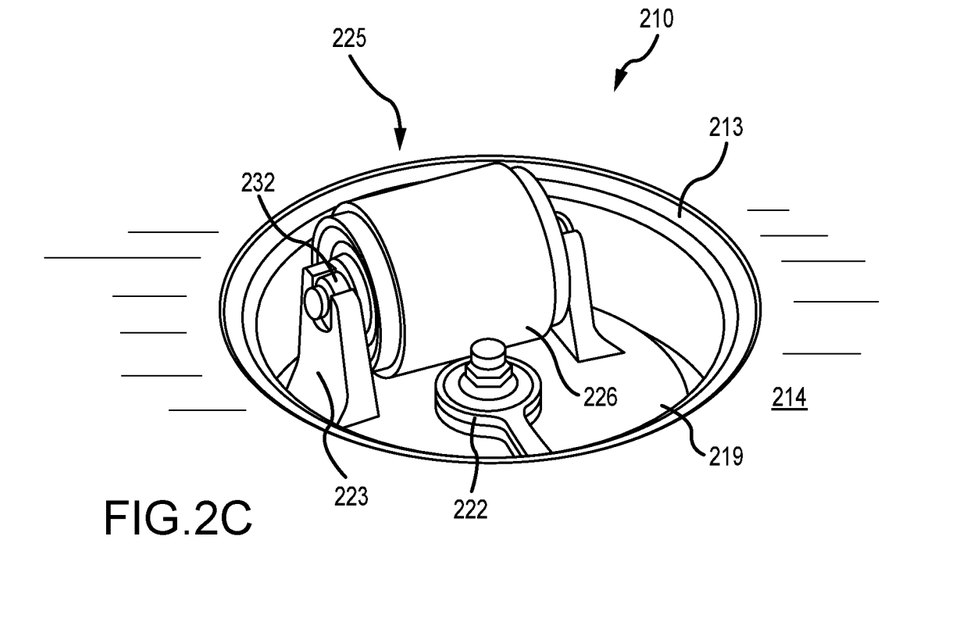

Referring now to FIGS. 2A, 2B and 2C, a brake caster 210, such as, for example, one of the brake caster assemblies 108 described above with reference to FIG. 1B, is illustrated in exploded and assembled forms. In accordance with various embodiments, the brake caster 210 includes a base assembly 212 and a brake mechanism 225. The base assembly 212 includes a cup 213 configured for mounting within a panel 214, such as, for example, one of the plurality of ball panels 106 described above with reference to FIG. 1B, a seal 215, a first ring 216, a thrust bearing 217 a second ring 218, a base 219 and a spherical bearing 220. As illustrated, a bolt 221 is configured to extend through the base assembly 212 and secures the cup 213, the seal 215, the first ring 216, the thrust bearing 217 and the second ring 218 to the base 219. The bolt 221 also extends through and secures the spherical bearing 220 to a spherical bearing housing 222 located within a center portion of the base 219. The combination of the spherical bearing 220 and the thrust bearing 217 enables the base 219 to rotate three-hundred sixty degrees (360°) with respect to the cup 213.

Still referring to FIGS. 2A, 2B and 2C, the brake mechanism 225 includes, in various embodiments, a roller cylinder 226 configured to provide a frictional surface to engage a bottom surface of a ULD, a brake subassembly 227, a slider disk subassembly 228, a shaft 229, a first roller bearing 230 and a second roller bearing 231. When assembled, the brake mechanism 225 is secured to a pair of members 223 that extend substantially vertically from the base 219. In various embodiments, the pair of members 223 are configured to receive the ends of the shaft 229 and to prevent the shaft 229 from rotating with respect to the base 219. For example, in various embodiments, one or both of the pair of members 223 may include an opening 224 having sides that are flat and configured to receive an end 232 (or both ends) of the shaft 229 that has corresponding flat sides, thereby limiting or preventing rotational movement of the shaft 229 with respect to both the base 219 and the pair of members 223 extending from the base 219. A threaded pin 299 (or a pair of pins or bolts and washers) may be used to secure the shaft 229 to the pair of members 223. Once assembled, the brake caster 210 may be lowered into the panel 214 and secured thereto with a circlip 233 or similar mechanism.

Referring now to FIGS. 3A, 3B, 3C, 3D, 3E and 3F, various illustrations are provided to further describe the components and other aspects of a brake mechanism 325, similar to the brake mechanism 225 described above with reference to FIGS. 2A-2C. In various embodiments, for example, the brake mechanism 325 includes a roller cylinder 326 configured to provide a frictional surface to engage a bottom surface of a ULD, a brake subassembly 327, a slider disk subassembly 328, a shaft 329, a first roller bearing 330 and a second roller bearing 331. As described above, the shaft 329 includes an end 332 (or two ends) having flat surfaces configured to limit or prevent the shaft from rotating with respect to a base of a base assembly, such as, for example, the base 219 of the base assembly 212 described above with reference to FIG. 2A.

Figure 3A:
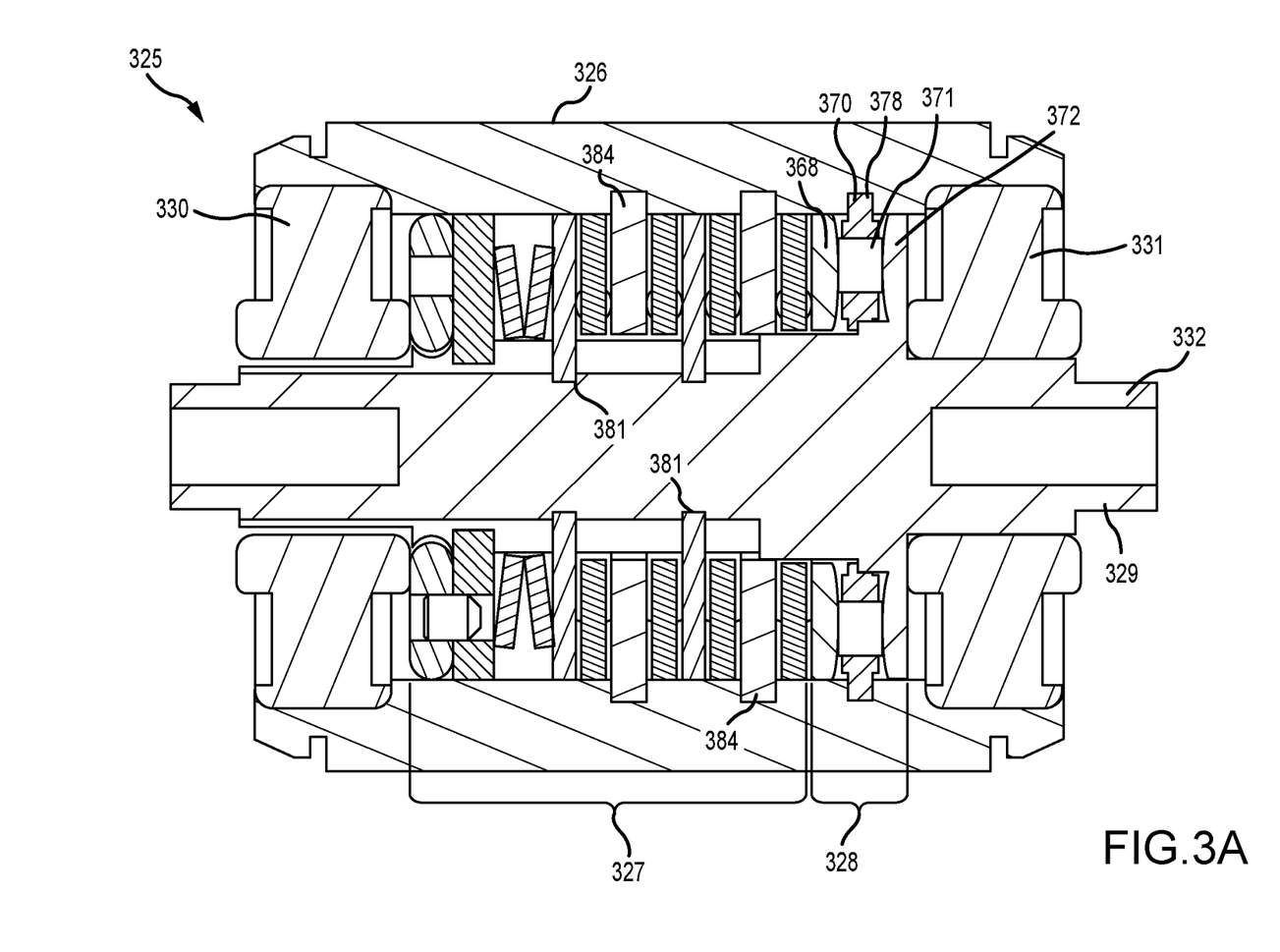
FIG. 3A illustrates a cross sectional schematic view of a brake mechanism, in accordance with various embodiments.
Figure 3B:
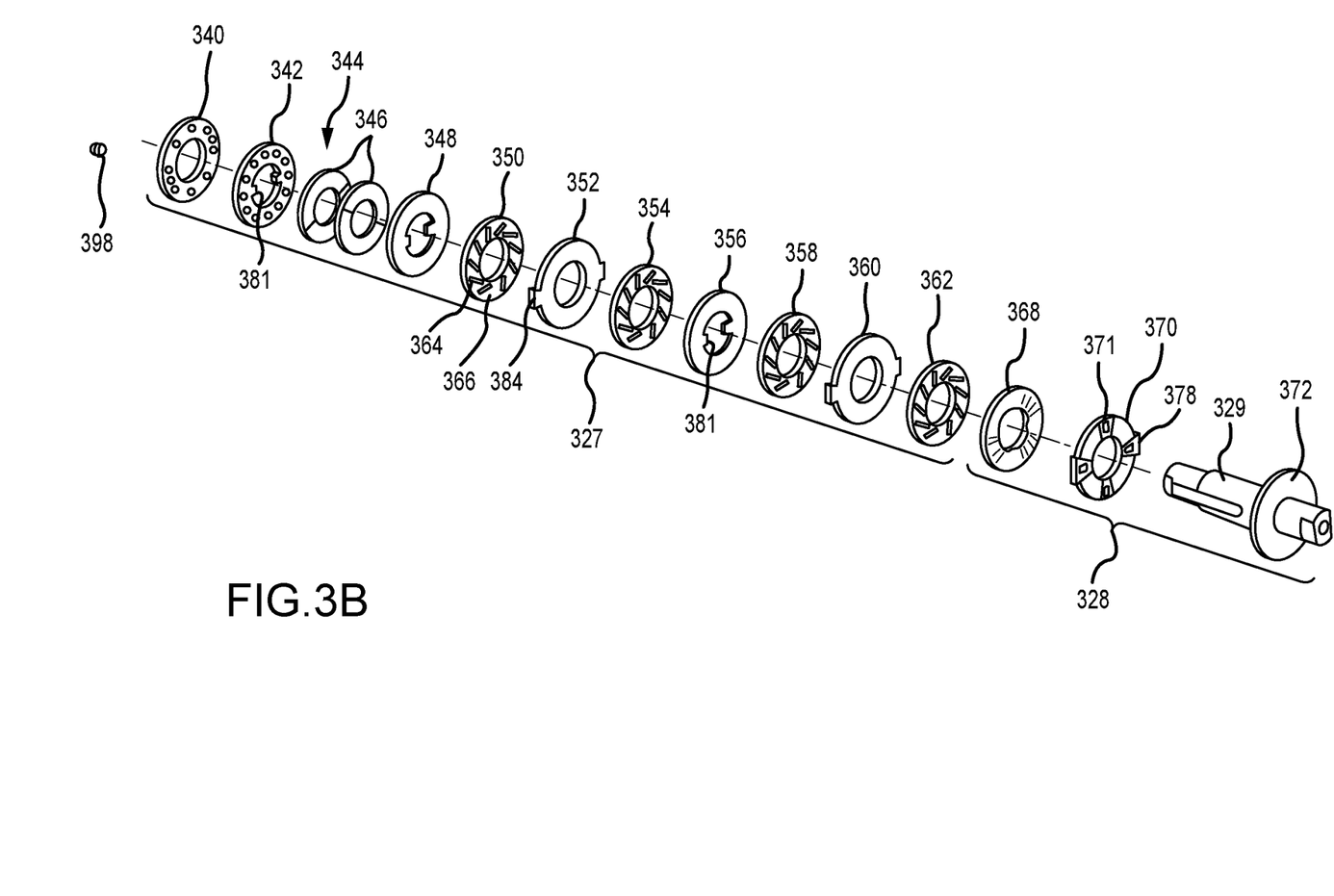
FIG. 3B illustrates an exploded view of a brake mechanism, in accordance with various embodiments.

Referring primarily to FIGS. 3A and 3B, the brake subassembly 327 includes a nut 340, a nut retainer 342, a bias element 344, such as, for example, a Belleville spring 346, a first inner plate 348 (or a first stator) configured to engage the shaft 329, a first roller and roller cage element 350, a first outer plate 352 (or a first rotor) configured to engage the roller cylinder 326, a second roller and roller cage element 354, a second inner plate 356 (or a second stator), a third roller and roller cage element 358, a second outer plate 360 (or a second rotor) and a fourth roller and roller cage element 362. A lock screw 398 is used to secure the nut 340 to the nut retainer 342. The inner plates and the outer plates act similar to stator disks and rotor disks, respectively, in a friction-based brake stack. In various embodiments, however, a roller and roller cage element is disposed between opposing faces of an inner plate and an outer plate to reduce or avoid surface contact between the opposing faces and the wear and heat that would be otherwise generated. As illustrated, the axis of each roller 364 within each roller cage 366 is inclined at an angle with respect to a radial direction (e.g., a direction perpendicular to an axis of the shaft 329). Inclination of the rollers at an angle provides a more effective braking action when an axial load is applied to the brake subassembly, against an axial counter load applied by the bias element 344.

Referring now to each of FIGS. 3A-3F, the slider disk subassembly 328 includes, in various embodiments, a slider plate 368, a guide plate 370 having a plurality of rollers 371 and a flange 372 projecting radially from the shaft 329. The slider plate 368 is configured to remain rotationally stationary with respect to the shaft 329. In various embodiments, for example, the slider plate 368 includes first flat surfaces 374 disposed on a radially inner surface that are configured to engage second flat surfaces 375 on a radially outer surface of the shaft 329. The first flat surfaces 374 and the second flat surfaces 375 prevent the slider plate 368 from rotating with respect to the shaft 329, but permit axial (or sliding) movement of the slider plate 368 with respect to the shaft 329.

Figure 3C:
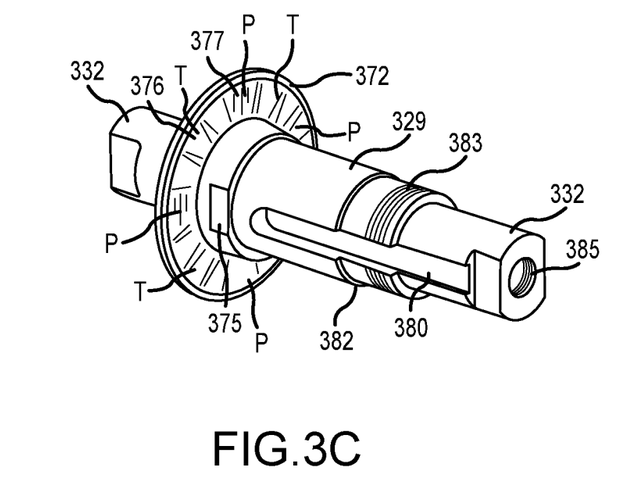
FIG. 3C illustrates a perspective view of a shaft of a brake mechanism, in accordance with various embodiments.
Figure 3D:
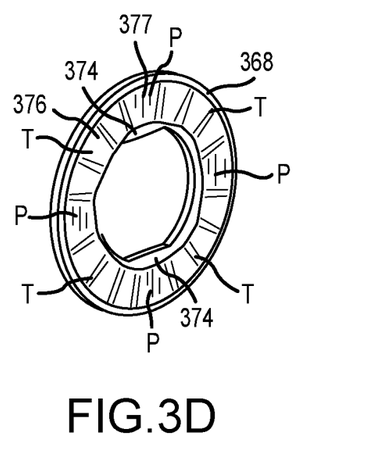
FIG. 3D illustrates a perspective view of a slider plate of a brake mechanism, in accordance with various embodiments.

In various embodiments, one or both of the slider plate 368 and the flange 372 include a peak 376 (e.g., a slider plate peak or a flange peak, or a plurality of such peaks) and a trough 377 (e.g., a slider plate trough or a flange trough, or a plurality of such troughs) on opposing faces. For example, as illustrated in FIGS. 3C and 3D, the slider plate 368 includes a plurality of peaks (P) interspersed with a plurality of troughs (T) about the face (or a first axial facing surface) of the slider plate 368. The plurality of peaks (P) is spaced at ninety degree (90°) intervals (e.g., at locations equal to 0°, 90°, 180° and 270°). Offset by forty-five degrees (45°), the plurality of troughs (T) is also spaced at ninety degree (90°) intervals (e.g., at locations equal to 45°, 135°, 225° and 315°). In various embodiments, the surface or axial face having the plurality of peaks (P) and the plurality of troughs (T) just described may define or be characterized by a first periodic function (e.g., a sine wave) extending around the face of the slider plate 368, with each peak and trough representing, for example, a radians of the periodic function. The flange 372, as illustrated, similarly includes a plurality of peaks (P) and troughs (T) spaced at ninety degree (90°) intervals and offset by forty-five degrees (45°) about the face (or a second axial facing surface) of the flange 372. Similar to the discussion above, the plurality of peaks and the plurality of troughs of the face of the flange 372 may define or be characterized by a second periodic function extending around the face of the flange 372. Typically, the plurality of peaks (P) and the plurality of troughs (T) on both the slider plate 368 and the flange 372 are in phase with each other and both the first periodic function and the second periodic function are substantially identical or identical. Further, while the illustrated embodiments include four peaks and four troughs interspersed among the peaks, the disclosure contemplates any number of peaks and troughs, generally an even number or both, and not necessarily arranged in the shape of a pure sine wave function. In other words, the functional shape of the peaks and troughs may comprise any functional relationship (including functional relationships defined, at least in part, by straight lines), so long as a plurality of peaks is interspersed with a plurality of troughs on the face of at least one of the slider plate 368 and the flange 372.

Figure 3E:
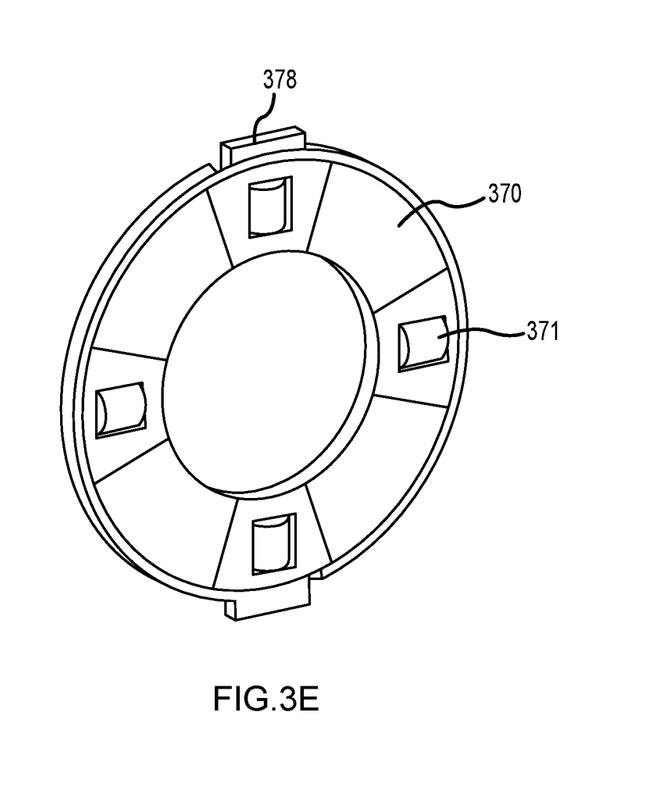
FIG. 3E illustrates a perspective view of a guide plate with rollers of a brake mechanism, in accordance with various embodiments.
Figure 3F:
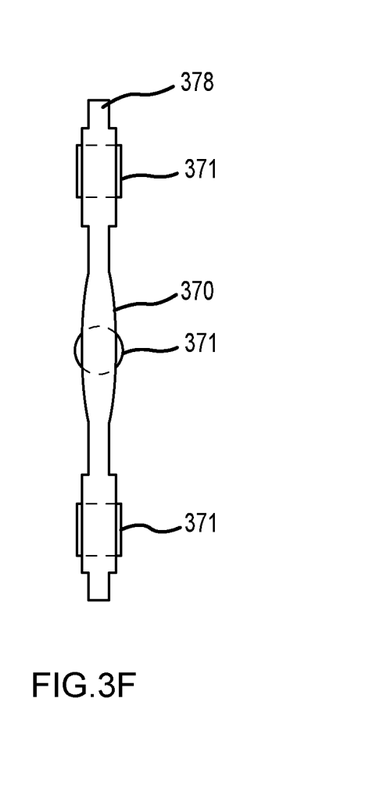
FIG. 3F illustrates a side view of a slider plate with rollers of a brake mechanism, in accordance with various embodiments.

Referring now to FIGS. 3E and 3D, the guide plate 370 having a plurality of rollers 371 is illustrated. In various embodiments, and consistent with the description of the slider plate 368 and the flange 372 above, the plurality of rollers 371 includes four rollers spaced at ninety degree (90°) intervals about the guide plate 370. As illustrated in FIGS. 3A and 3B, the plurality of rollers 371 are disposed at a radial location on the guide plate 370 and configured to roll with the peaks and the troughs of the flange 372 and the slider plate 368 as the guide plate 370 rotates with respect to both the flange 372 and the slider plate 368. As further illustrated in FIGS. 3A, 3E and 3F, the guide plate 370 includes one or more radially outward extending tabs 378 configured to engage with the roller cylinder 326 and not with the shaft 329. As a result, when the roller cylinder 326 is driven (e.g., by a ULD) to rotate about the shaft 329, the guide plate 370 will rotate relative to the slider plate 368 and the flange 372, both of which are held rotationally stationary with respect to the shaft 329. As the guide plate 370 so rotates, the plurality of rollers 371 disposed thereon will roll up and down the peaks and troughs, respectively, thereby urging the slider plate 368 to move back and forth in an axial direction with respect to the shaft 329.

Referring again to FIG. 3C, the shaft 329 further includes an elongate slot 380 (or a plurality of elongate slots) for receiving radially inward extending tabs 381 extending from a radially inner surface of the first inner plate 348 (or a first stator), the second inner plate 356 (or a second stator) and the nut retainer 342. In various embodiments, the shaft 329 also includes a step face 382 to stop the nut retainer 342 from sliding axially beyond the step face 382 toward the flange 372, an external threaded section 383 for threading the nut 340, an end 332 (or both ends) that has flat sides that correspond with mounting structure (e.g., the pair of members 223 described above with reference to FIG. 2A) and an internal threaded section 385 for receiving a mounting pin or bolt, such as, for example, the threaded pin 299 described above with reference to FIG. 2A. In various embodiments, and similar to the shaft 329, the roller cylinder 326 will also include one or more elongate slots configured to receive radially outward extending tabs 384 extending from a radially outer surface of the first outer plate 352 (or a first rotor) and the second outer plate 360 (or a second rotor), as well as with the one or more radially outward extending tabs 378 of the guide plate 370.

Figure 4A:
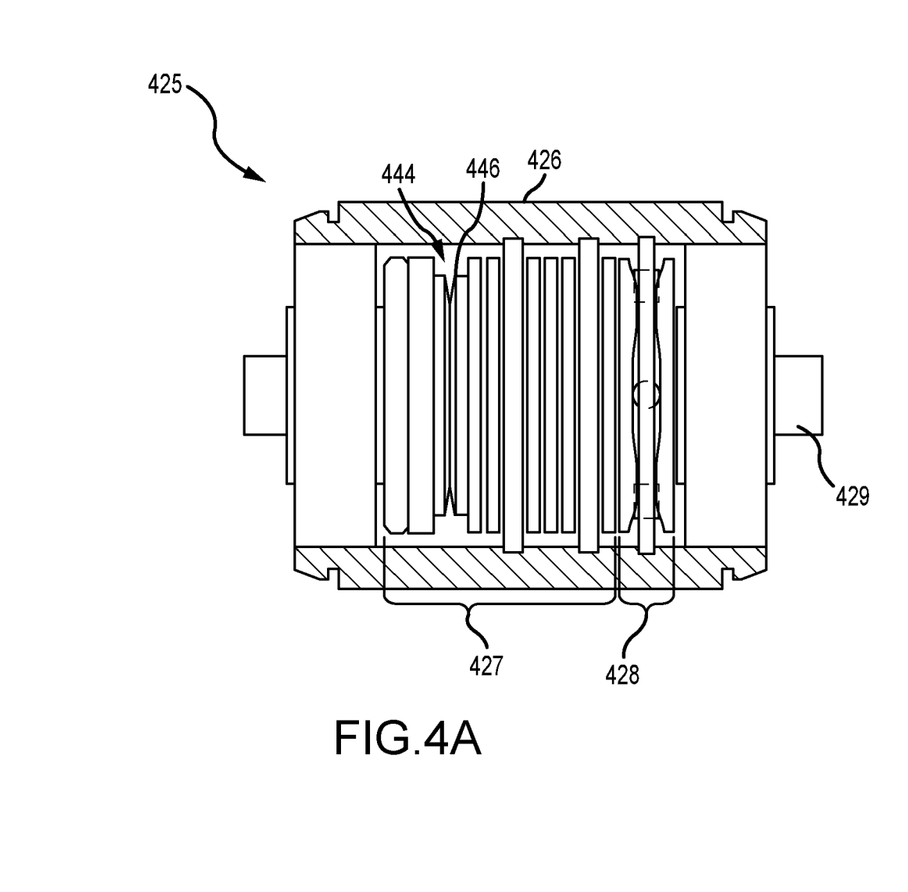
FIGS. 4A and 4B illustrate a brake mechanism in a state of minimum brake force, in accordance with various embodiments.
Figure 4B:
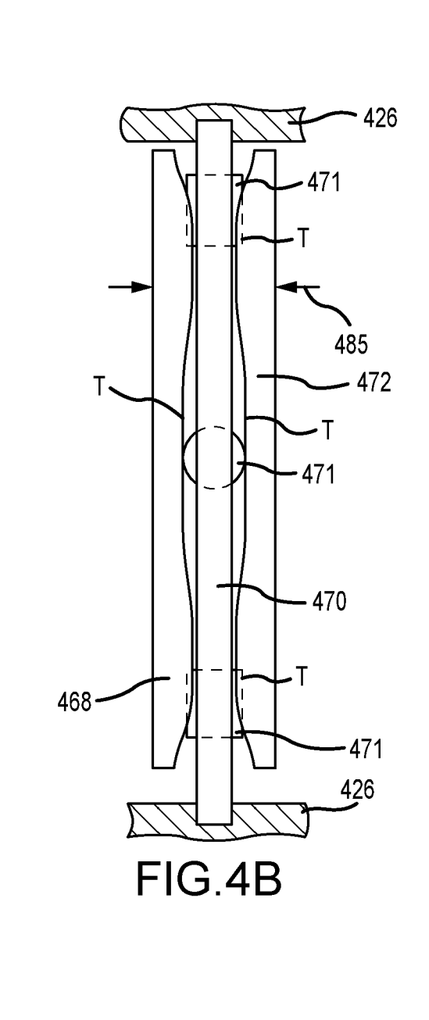

Referring now to FIGS. 4A, 4B, 4C and 4D, operation of a brake mechanism 425, similar to the brake mechanism 325 described above with reference to FIGS. 3A-3F, is illustrated and described, in accordance with various embodiments. Similar to the above embodiments, the brake mechanism 425 includes a brake subassembly 427, a slider disk subassembly 428, a roller cylinder 426 and a shaft 429. Referring to FIG. 4A and FIG. 4B (which is a close up view of the slider disk subassembly 428 shown in FIG. 4A), the brake mechanism 425 assumes a state of minimum brake force, where each of a plurality of rollers 471 mounted on a guide plate 470 reside in respective troughs of a plurality of troughs (T) spaced about both a flange 472 projecting from the shaft 429 and a slider plate 468 of the slider disk subassembly 428, in a fashion similar to that described above. In the state of minimum brake force, the slider disk subassembly 428 assumes a minimum thickness 485. While in the state of minimum thickness, a bias element 444 (e.g., a Belleville spring 446) of the brake subassembly 427 remains substantially uncompressed (or in a state of minimum compression consistent with a default pre-torque or brake force), thereby resulting in the brake subassembly 427 providing a minimum brake force against rotation of the roller cylinder 426 about the shaft 429.

Figure 4C:
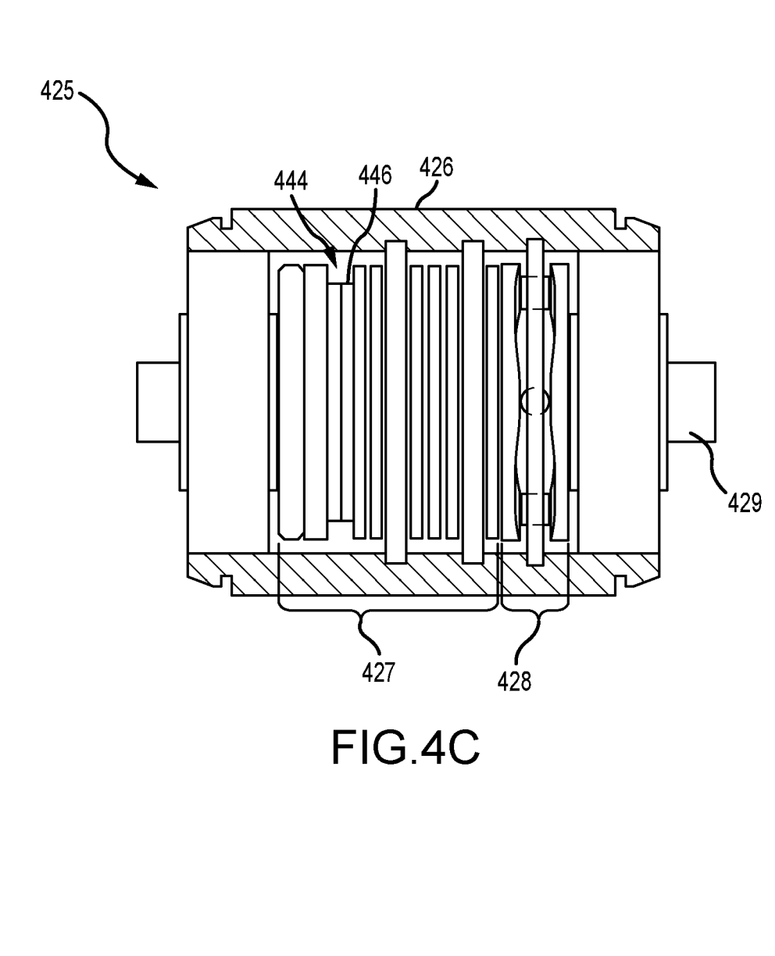
FIGS. 4C and 4D illustrate a brake mechanism in a state of maximum brake force, in accordance with various embodiments.
Figure 4D:
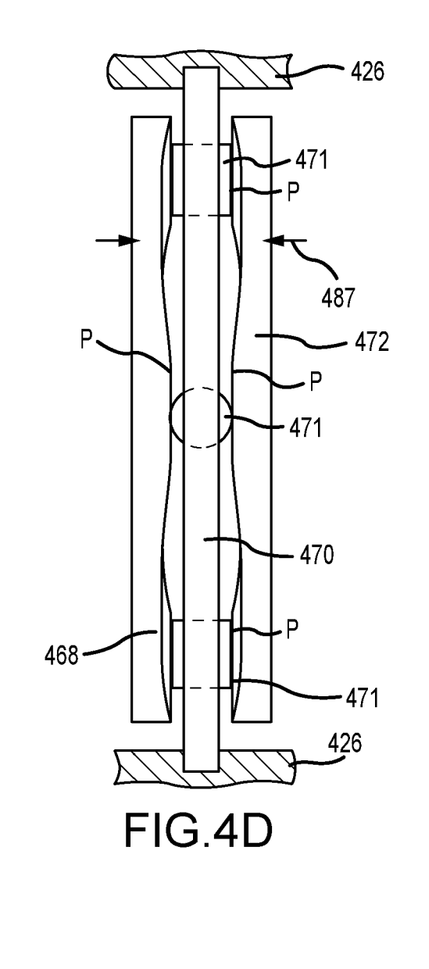

In contrast, referring to FIG. 4C and FIG. 4D (which is a close up view of the slider disk subassembly 428 shown in FIG. 4C), the brake mechanism 425 assumes a state of maximum brake force, where each of the plurality of rollers 471 mounted on the guide plate 470 reside on respective peaks of a plurality of troughs (P) spaced about both the flange 472 and the slider plate 468 of the slider disk subassembly 428, in a fashion similar to that described above. In the state of maximum brake force, the slider disk subassembly 428 assumes a maximum thickness 487, greater than the minimum thickness 485. While in the state of maximum thickness, the bias element 444 (e.g., the Belleville spring 446) of the brake subassembly 427 becomes substantially compressed (or in a state of maximum compression), thereby resulting in the brake subassembly 427 providing a maximum brake force against rotation of the roller cylinder 426 about the shaft 429.

Figure 5:
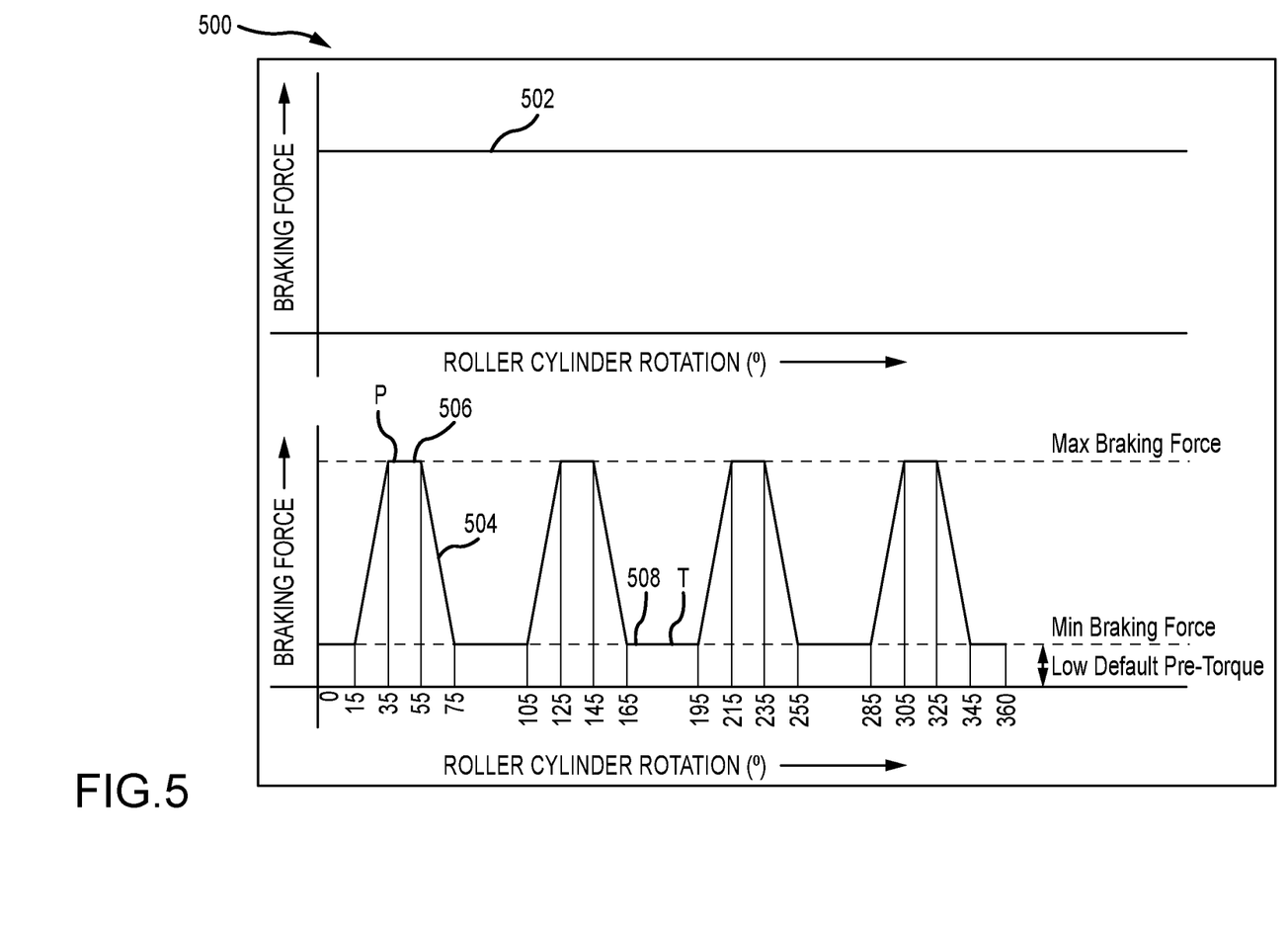
FIG. 5 provides graphs illustrating brake force versus rotation of a roller cylinder, in accordance with various embodiments.

Referring to FIG. 5, the change between states of maximum force and minimum force against rotation of a roller cylinder, such as, for example, the roller cylinder 426 of the brake mechanism 425 described above, is graphically illustrated in a graph 500 of brake force vs. degree of rotation of a roller cylinder (e.g., from 0° to 360°). Two graphs appear in FIG. 5. The top graph depicts a typical brake caster set to apply a constant maximum brake force 502 as described in the background section above, regardless of the degree of rotation of a corresponding roller cylinder (e.g., regardless of the position of rotation about a 360° rotational cycle). Such an apparatus may lead to flattening of the roller cylinder due to non-rotation for ULDs having a weight less than that required to overcome the constant maximum brake force and to rotate the roller cylinder. The bottom graph depicts a cyclic-brake force 504 achieved through the various embodiments disclosed herein. As illustrated the cyclic-brake force 504 exhibits a maximum brake force 506 that will occur when each of a plurality of rollers on a guide plate are positioned proximate the peaks (P) of a flange or a slider plate, as described above. A minimum brake force 508, on the other hand, will occur when each of the plurality of rollers on the guide plate are positioned proximate the troughs (P) of the flange or the slider plate, as described above. Accordingly, and as illustrated, the cyclic-brake force 504 is developed through each rotation of the roller cylinder from 0° to 360°. As illustrated, a default pre-torque, providing the minimum brake force, may be built into the brake mechanism through an initial compression of the bias element within the brake subassembly. In addition, it should be apparent from the graph of cyclic brake force that the surface of the flange or the slider plate or both is not a pure sine wave, as both the peaks and the troughs have a substantially flat portion, leading, for example, to ta constant maximum brake force between 35° and 55° and a constant minimum brake force between 125° and 145°. A variety of cyclic brake force profiles over a period of cyclic-brake force (e.g., over a period of 360° of rotation of the roller cylinder) may be achieved through variations in the faces of the flange or the slider plate or both.

Figure 6:
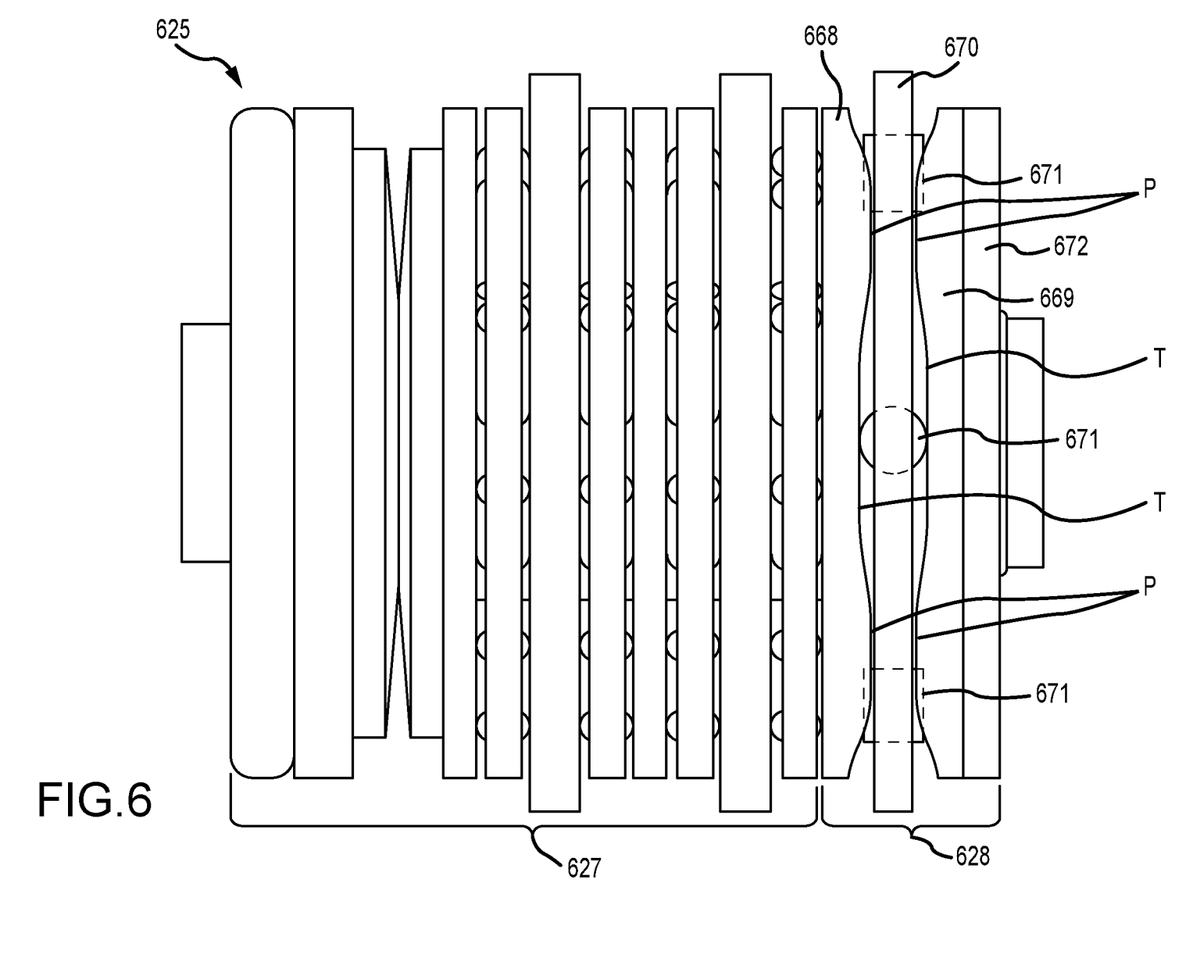
FIG. 6 illustrates a brake mechanism, in accordance with various embodiments.

Referring to FIG. 6, a brake mechanism 625 is illustrated, in accordance with various embodiments. The brake mechanism 625 includes a brake subassembly and a slider disk subassembly 628. The brake subassembly 627 is similar to the brake subassemblies described above, so is not described further here. The slider disk subassembly 628 includes a slider plate 668 and a guide plate 670 with a plurality of rollers 671 similar to the slider plates and guide plates described above. The slider disk subassembly 628 further includes a stationary plate 669 configured for attachment to a flange 672 that is itself coupled to a shaft, similar to the shafts described above, excepting the flange has a generally flat surface, rather than a surface including peaks and troughs. In various embodiments, both the slider plate 668 and the stationary plate 669 have opposing surfaces characterized by a plurality of peaks (P) (e.g., a slider plate peak or a stationary plate peak, or a plurality of such peaks) and a plurality of troughs (T) (e.g., a slider plate trough or a stationary plate trough, or a plurality of such troughs), similar to those described above. As described, operation of the brake mechanism 625 is substantially identical to operation of the other brake mechanisms described above. One benefit of the brake mechanism 625 and, in particular, the slider disk subassembly 628, is the slider plate 668 and the stationary plate 669 may be removed and replaced, either due to wear or to a desire to change or modify the cyclic-brake force profile, without the need to change the shaft, which otherwise would include the flange having a surface with the peaks and troughs as described above.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

Systems, methods and apparatus are provided herein. In the detailed description herein, references to "one embodiment," "an embodiment," "various embodiments," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

In various embodiments, system program instructions or controller instructions may be loaded onto a tangible, non-transitory, computer-readable medium (also referred to herein as a tangible, non-transitory, memory) having instructions stored thereon that, in response to execution by a controller, cause the controller to perform various operations. The term "non-transitory" is to be understood to remove only propagating transitory signals per se from the claim scope and does not relinquish rights to all standard computer-readable media that are not only propagating transitory signals per se. Stated another way, the meaning of the term "non-transitory computer-readable medium" and "non-transitory computer-readable storage medium" should be construed to exclude only those types of transitory computer-readable media that were found by In Re Nuijten to fall outside the scope of patentable subject matter under 35 U.S.C. § 101.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f) unless the element is expressly recited using the phrase "means for." As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

Finally, it should be understood that any of the above described concepts can be used alone or in combination with any or all of the other above described concepts. Although various embodiments have been disclosed and described, one of ordinary skill in this art would recognize that certain modifications would come within the scope of this disclosure. Accordingly, the description is not intended to be exhaustive or to limit the principles described or illustrated herein to any precise form. Many modifications and variations are possible in light of the above teaching.

What is claimed is:

1. A brake mechanism for a brake caster, comprising:
   a shaft;
   a guide plate having a roller; and
   a slider plate having a first axial facing surface with a slider plate trough and a slider plate peak, the slider plate configured to slide on the shaft in response to the roller interacting with the slider plate trough and the slider plate peak.

2. The brake mechanism of claim 1, wherein the guide plate is configured for rotational engagement with a roller cylinder.

3. The brake mechanism of claim 2, wherein the slider plate is rotationally stationary with respect to the shaft.

4. The brake mechanism of claim 3, wherein the slider plate is coupled to a brake subassembly configured to cycle between a maximum brake force and a minimum brake force in response to axial movement of the slider plate.

5. The brake mechanism of claim 1, wherein the shaft includes a second axial facing surface opposing the first axial facing surface, the second axial facing surface having a flange trough and a flange peak.

6. The brake mechanism of claim 5, wherein the guide plate is disposed intermediate the first axial facing surface and the second axial facing surface.

7. The brake mechanism of claim 6, wherein the slider plate is configured to slide on the shaft in response to the roller interacting with the slider plate trough and the slider plate peak and the flange trough and the flange peak.

8. The brake mechanism of claim 7, wherein the slider plate trough and the slider plate peak define a first periodic function.

9. The brake mechanism of claim 8, wherein the flange trough and the flange peak define a second periodic function.

10. The brake mechanism of claim 9, wherein at least one of the first periodic function and the second periodic function define a sine wave.

11. The brake mechanism of claim 9, wherein one or more of the slider plate trough, the slider plate peak, the flange trough and the flange peak include a portion defined by a flat surface configured to generate a constant maximum brake force or a constant minimum brake force during a period of cyclic-brake force.

12. The brake mechanism of claim 1, further comprising a stationary plate configured for attachment to a flange on the shaft, the stationary plate having a second axial facing surface opposing the first axial facing surface, the second axial facing surface having a stationary plate trough and a stationary plate peak.

13. The brake mechanism of claim 12, wherein the guide plate is disposed intermediate the first axial facing surface and the second axial facing surface.

14. A brake caster, comprising:
a base; and
a brake mechanism connected to the base, the brake mechanism comprising a brake subassembly coupled to a slider disk subassembly, the brake subassembly configured to provide a cyclic-brake force in response to axial movement of a slider plate within the slider disk subassembly.

15. The brake caster of claim 14, wherein the slider disk subassembly includes a shaft, a guide plate having a roller and the slider plate, the slider plate having a first axial facing surface with a slider plate trough and a slider plate peak, the slider plate configured to slide on the shaft in response to the roller interacting with the slider plate trough and the slider plate peak, the first axial facing surface characterized by a first periodic function.

16. The brake caster of claim 15, further comprising a second axial facing surface opposing the first axial facing surface, the second axial facing surface characterized by a second periodic function.

17. The brake caster of claim 16, wherein the second axial facing surface is provided by one of a flange attached to the shaft or a stationary plate disposed adjacent the flange.

18. The brake caster of claim 14, wherein the base is configured to rotate about an axis perpendicular to a conveyor plane.

19. A slider disk subassembly, comprising:
a guide plate having a roller; and
a slider plate having a first axial facing surface with a slider plate trough and a slider plate peak, the slider plate configured to slide on a shaft in response to the roller interacting with the slider plate trough and the slider plate peak.

20. The slider disk subassembly of claim 19, wherein the slider plate trough and the slider plate peak define a first periodic function over at least a portion of the first axial facing surface.

* * * * *